Jan. 3, 1928.
N. MILLER
ARTIFICIAL TEETH
Filed July 21, 1924
1,654,743
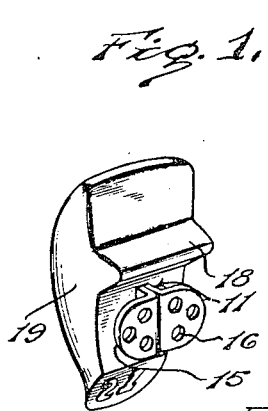
Fig. 1.
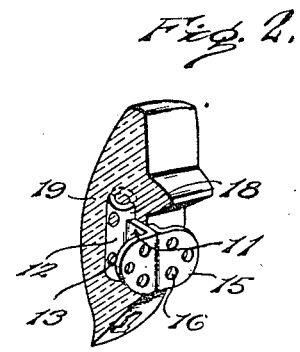
Fig. 2.
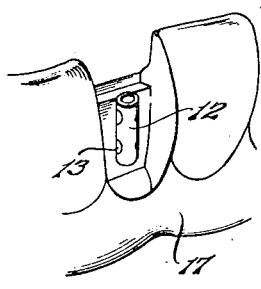
Fig. 4.
Fig. 3.
Inventor
N. Miller
By Lacy & Lacy, Attorneys Patented Jan. 3, 1928.

1,654,743

UNITED STATES PATENT OFFICE.

NORMAN MILLER, OF MADILL, OKLAHOMA.

ARTIFICIAL TEETH.

Application filed July 21, 1924. Serial No. 727,296.

This invention relates to improvements in artificial teeth or facings.

It is a well known fact that the ordinary artificial tooth presents certain disadvantages. In one type of tooth now in general use, two pins are embedded in the tooth and constitute the means for anchoring the tooth to the plate or bridge as the case may be. In another type, flat-sided spaced pins are embedded in the tooth and constitute the anchoring means. However, it has been found that teeth anchored in this manner are not as secure as might be desired and, furthermore, they are liable to fracture. Should they become fractured or loosened, they can be repaired only with great difficulty and the work involved consumes considerable time.

Therefore, when such teeth are employed and a tooth becomes broken or loosened, the patient is put to considerable inconvenience while awaiting repair of the plate or bridge work as the case may be. In view of the foregoing, it is one of the important objects of the present invention to provide an artificial tooth having a novel anchoring means which is baked directly in the porcelain tooth and which is of such construction that it will materially reinforce and strengthen the tooth and render the same less liable to fracture. Likewise, in this connection, the invention contemplates so constructing the anchoring means that it will anchor the tooth to the plate in a more secure manner than has heretofore been possible.

In the accompanying drawings:

Figure 1 is a perspective view of an artificial tooth for plate work produced in accordance with the present invention.

Figure 2 is a sectional perspective view of the tooth shown in Figure 1, and illustrating the manner in which the anchoring member is baked in the said tooth.

Figure 3 is a perspective view of the anchoring member shown in Figures 1 and 2 before its embedment in the material of the tooth.

Figure 4 is a perspective view of a portion of a plate formed in accordance with this invention with one tooth removed and showing the anchor for the tooth carried by the plate.

The accompanying drawing illustrates the embodiment of the principles of the invention in an artificial tooth for plate work and Figure 3 illustrates the anchoring member which is indicated in general by the numeral 11 and is formed from a blank bent to provide a hollow cylindrical head 12 formed with openings 13 and anchoring tongues 14 which extend radially from the head 12 and have their outer ends 15 more or less blunt and rounded. By having the head formed as shown, the plastic from which the tooth is made will enter the head through its open ends and the openings 13 and completely fill it. Therefore, when the tooth is baked, the head will be firmly embedded in the tooth and prevented from having any movement therein. It should also be noted that the tongues 14 are each formed with a number of openings indicated by the numeral 16, into which a portion of the plastic material of which the plate, a portion of which is shown in Figure 4 and indicated by the numeral 17, is formed, may enter for the purpose of insuring of a firm bond when the plate is vulcanized, the tongues being bent laterally in opposite directions prior to embedment in the said material of the plate as illustrated in Figures 1 and 2 of the drawings. The head 12 at its end which is presented toward the incisal end of the false tooth in which the head is baked, extends a greater or less distance above or beyond the adjacent lateral edges of the locking tongues 14, as indicated by the numeral 18, for a purpose which will be made apparent. The false tooth is clearly shown in Figures 1 and 2, in its completed condition and is indicated by the numeral 19, the tooth being of porcelain, as usual, and the head 12 and a short portion of the tongues 14 being embedded in the porcelain while in a plastic state and being baked into the tooth during the baking operation. By reference to Figure 2 of the drawings, it will be observed that without unnecessarily increasing the dimensions of the tongues 14, and by providing the extensions 18 of the head 12, the extension is adapted to seat well up in the tooth in the direction of the incisal end, thereby obtaining a more firm and secure anchorage and materially reinforcing the tooth.

From the foregoing description of the invention it will be understood that there is provided an artificial tooth having anchoring means which serves not only as a medium whereby the tooth may be securely anchored to the plate, but that likewise the anchoring means serves as a highly efficient reinforcement so bracing the tooth as to render it unikely that any fracture of the facing or tooth will occur.

Having thus described the invention, what I claim is:

An artificial tooth, and an anchoring member therefor, the anchoring member comprising a hollow cylindrical head having oppositely located openings in its wall, and anchoring tongues projecting radially from the head in mutual contact with each other and being bent intermediate their ends to provide right angularly extending anchoring portions, said tongues being spaced from one end of said head, the head being directly embedded in the material of the tooth and the said material filling the interior of the said head and the said openings in the head, the said anchoring tongues having their said oppositely extended portions formed with openings.

In testimony whereof I affix my signature.

NORMAN MILLER. [L. S.]